United States Patent
Sinko et al.

(10) Patent No.: US 6,447,594 B1
(45) Date of Patent: Sep. 10, 2002

(54) STRONTIUM CHROMATE CORROSION INHIBITOR PIGMENT WITH REDUCED SOLUBILITY

(75) Inventors: John Sinko, Mequon; Michael Denesha, Dousman, both of WI (US)

(73) Assignee: Wayne Pigment Corporation, Milwaukee, WI (US)

( * ) Notice: Subject to any disclaimer, the term of this patent is extended or adjusted under 35 U.S.C. 154(b) by 0 days.

(21) Appl. No.: 09/880,666

(22) Filed: Jun. 13, 2001

(51) Int. Cl.⁷ .................................................. C09C 1/34
(52) U.S. Cl. ................ 106/453; 106/14.05; 106/14.12; 106/14.21; 252/387; 252/389.2; 252/389.23; 252/389.24; 423/593; 423/606; 423/607
(58) Field of Search .................... 106/14.05, 14.12, 106/14.21, 453; 252/387, 389.2, 389.23, 389.24; 423/593, 606, 607

(56) References Cited

U.S. PATENT DOCUMENTS

| | | | |
|---|---|---|---|
| 4,306,988 A | 12/1981 | Rothgery | 252/150 |
| 4,623,474 A | 11/1986 | Holstedt et al. | 252/47.5 |
| 5,008,153 A | 4/1991 | Hayes | 428/429 |
| 5,476,552 A | * 12/1995 | Tucker et al. | 148/248 |
| 5,951,747 A | 9/1999 | Lewis et al. | 106/14.44 |
| 6,068,711 A | 5/2000 | Lu et al. | 148/273 |
| 6,083,308 A | 7/2000 | Fletcher | 106/14.12 |

OTHER PUBLICATIONS

Challenges of Chromate Inhibitor Pigments Replacement in Organic Coatings, John Sinko, Wayne Pigment Corp., Milwaukee, WI. Presented at Athens, Greece on Jul. 5, 1999.

* cited by examiner

*Primary Examiner*—Anthony Green
(74) *Attorney, Agent, or Firm*—Ryan Kromholz & Manion, S.C.

(57) ABSTRACT

A process for producing a strontium chromate corrosion inhibitor includes the steps of providing an aqueous slurry containing dispersed particulate strontium chromate, adding to the slurry a phosphoric acid or a neutral or acidic soluble salt of a phosphoric acid selected from the group consisting of ortho-phosphoric, pyro-phosphoric, tri-phosphoric, polyphosphoric, metaphosphoric, polymetaphosphoric, cyclic tri-metaphosphoric acid, and phosphorous acid, and, filtering and drying the resultant material whereby particulate strontium chromate of reduced solubility is produced.

14 Claims, No Drawings

STRONTIUM CHROMATE CORROSION INHIBITOR PIGMENT WITH REDUCED SOLUBILITY

The present invention relates to novel modified pigment grade strontium chromate corrosion inhibitors characterized by reduced solubility in water and undiminished $CrO_4^{--}$ content.

BACKGROUND OF THE INVENTION

Several pigment grade inorganic and organic chromates are known to the art and employed in organic based protective primer applications, most notably: $SrCrO_4$ and $Ca^{++}$, $Ba^{++}$, $Zn^{++}$ chromates.

Many chromate corrosion inhibitor pigments used to be ubiquitously applied in the paint and coating industry, worldwide as well as in the United States. Due to environmental concerns, however, most of them have been practically eliminated from general industrial use during the past two decades and replaced with less effective phosphate-, molybdate-, borate- or silicate-based products, which, notably, also represent all of the available possibilities offered by inorganic chemistry for this purpose. The elimination of chromate inhibitor pigments from the paint and coating industry appears to be a compromise allowed primarily by improvements in coating science and resin chemistry. Notable exceptions are high-performance organic coatings, especially aircraft and coil primers, which possess no significant barrier capacity and consequently, require the inhibitor efficiency of chromates without any possibility of compromise. Not surprisingly, the corrosion inhibitor pigment of choice for aircraft and coil primers is $SrCrO_4$, a preference entirely justified, considering this product's remarkably advantageous pigment qualities, as subsequently discussed.

Corrosion inhibitor pigments function as reservoirs of inhibitor species built into organic primers. In general, anions are the active inhibitor species of corrosion inhibitor pigments, which, in the case of chromates, is $CrO_4^{--}$. It will be apparent, that high $CrO_4^{--}$ concentration per unit volume of pigment, i.e., high "specific inhibitor capacity", is the desirable property of pigment grade chromates. This is particularly true in view of the fact the average thickness of high performance aircraft and coil primers is approximately 10 to 20 microns.

Understandably, high inhibitor capacity is expected to be concentrated in the limited volume available for corrosion inhibitor pigments in high performance organic primer applications. This concept is quantified by $$e_{isp}=c_i \cdot g_{sp}/W_m.$$

$e_{isp}$ represents the specific inhibitor capacity of corrosion inhibitor pigments, where Ci and gsp are, respectively, the weight ratio of $CrO_4^{--}$ in the pigment and the specific gravity of the pigment, and Wm is the molar weight of the inhibitor species, in this case of $CrO_4^{--}=116$. It will be apparent that a combination of high $CrO_4^{--}$ content and high specific gravity results in high specific inhibitor capacity, as it can be seen by comparing the cases of $CaCrO_4$ and $SrCrO_4$ presented in Table 1. Due to higher specific gravity, the specific inhibitor capacity of $SrCrO_4$ (18.4 mmol/cm$^3$) is higher at only 57% $CrO_4^{--}$ content than at 74% $CrO_4^{--}$ content of $CaCrO_4$ ($e_{isp}=13.1$ mmol/cm$^3$). Specific inhibitor capacity is not informative, however, with respect to inhibitive activity of corrosion inhibitor pigments. Corrosion and its inhibition are aqueous, dynamic processes and consequently, in coating applications, the kinetic availability of inhibitor species is essentially a function of the solubility of pigment grade corrosion inhibitors. It will be apparent that corrosion inhibitor pigments must possess effective, however limited, solubility in water, as well as to dissociate and hydrolyze as ordinary electrolytes:

$$SrCrO_4 \leftrightharpoons Sr^{++}+CrO_4^{--}+H_2O \leftrightharpoons HCrO_4^{-}+OH^- \qquad 1.$$

The corrosion inhibitor activity of pigments can be conveniently qualified by $I_i=n \cdot c_{isat}/c_{icrt}$, the inhibitive activity parameter, where $c_{isat}$ and $c_{icrt}$ are the is pigments' solubility and, respectively, the critical concentration of the related inhibitor species, in this case $CrO_4^{--}$. A stoichometric parameter, n=1 in the case of alkaline earth chromates. As for $c_{icrt}$, it characterizes distinct inhibitor anionic species and it is defined as the minumum concentration of anionic species necessary to maintain metal substrates in a passive state when in contact with aqueous phases. It will be apparent that $I_i<1$ indicates low inhibitor activity of pigments and consequently, are unacceptable materials. Similarily, high values of $I_i$ are not acceptable, because highly soluble pigments promote degradation of organic coatings by osmotic blistering as well as by leaching, the latter resulting in increased porosity and increased water absorption in organic coatings. Consequently, it appears that organic coatings impose a limited window or range of solubilities for corrosion inhibitor pigments. This range is estimated to correspond to $1<I_i<100$ and preferably $1<I_i<10$. As can be seen from Table 1, $SrCrO_4$ is characterized by $I_i \sim 5$ and corresponding solubility of about $c_{isat}=5$ mmoles/L.

TABLE A

| General Formula | $c_i$ | $g_{sp}$ | $c_{isat}$ mmmol/L | pH | $ei_{sp}$ mmol/cm$^3$ | $I_i$ |
|---|---|---|---|---|---|---|
| CaCro$_4$ | 0.74 | 2.05 | 141 | 11.0 ± 3 | 13.1 | 141 |
| SrCro$_4$ | 0.57 | 3.79 | 5 | 8.3 ± 0.5 | 18.6 | 5 |
| K$_2$CrO$_4$*3ZnCro$_4$ *Zn(OH)$_2$*2H$_2$O | 0.53 | 3.35 | 11 | 6.8 ± 0.2 | 15.3 | 11 |
| BaCrO$_4$ | 0.46 | 4.4 | 0.2 | 7.8 ± 0.5 | 17.3 | 0.2 |
| Zn$_5$CrO$_{12}$H$_8$[a] | 0.2 | 3.45 | 0.2 | 7.2 ± 0.2 | 5.95 | 0.2 |
| PbCrO$_4$ | 0.36 | 6.12 | 1.3× 10−3 | | 18.9 | 1.3 × 10−3 |
| Na$_2$Cro$_4$[b] | 0.71 | 2.7 | 5.4× 104 | | 16.1 | 5 × 102 |

[a]basic zinc chromate
[b]does not qualify as pigment

As can be seen, due to its high specific inhibitor capacity ($e_{isp}=18.6$ mmol/cm$^3$, the highest of all corrosion inhibitor pigment grade chromates) and with moderate yet effective solubility ($I_i \sim 5$), $SrCrO_4$ appears to be the most effective and valuable of all chromate corrosion inhibitor pigments. However, due to its solubility, $SrCrO_4$ is also moderately hygroscopic, an undesirable property of some characteristic finely divided pigment grade products. This generally results in unwanted water vapor absorption from the surrounding air, and consequently, a moderate tendency for agglomeration or clump formation, especially during transport or storage in high humidity conditions. Although clumping does not necessarily alter the initial particle size distribution or fineness of pigment grade $SrCrO_4$, it is undesirable, nevertheless, for it adversely affects dispersion procedures and ultimately results in increased energy consumption in paint manufacture.

As intuitively expected, the kinetics and extent of the water absorption process by pigment grade $SrCrO_4$ is a function of the relative humidity (R.H.) of the surrounding air, among other factors. At 60% R.H., the extent of water vapor absorption by $SrCrO_4$ is negligible and independent of exposure time.

In contrast, however, the rate of water vapor absorption is considerable at 100% R.H. and a function of exposure conditions and exposure time. Such conditions can result in a significant increase (4–7% by weight) in the moisture content of pigment grade $SrCrO_4$. As also expected, the process is found to be reversible. It is observed, that water absorbed by $SrCrO_4$ at 100% R.H., desorbs spontaneously at 60% R.H. and ambient temperature, until a corresponding equilibrium value of <0.1% moisture content is established. It is apparent that clumping of pigment grade $SrCrO_4$ is a consequence of the water absorption process' reversible character and, presumably, it specifically occurs during desorption.

DETAILED DESCRIPTION OF THE INVENTION

It is a principal object of the present invention to provide a process and a strontium chromate, calcium chromate or zinc (II) chromate product produced by the process having reduced solubility in water with undiminished $CrO_4^{--}$ content. It is a further aspect of the invention that the strontium chromate products display noticeably enhanced corrosion inhibitor performance. In accordance with a further aspect of the invention, the products have a reduced tendency for slump formation.

It was discovered pursuant to the present invention, that the natural solubility of chromates such as $SrCrO_4$ in water (about 5 mmole/L at ambient temperature) can be reduced approximately 40% to 70%, without any negative effect on the pigment's corrosion inhibition performance. To the contrary, as documented in Example 6, pigment grade $SrCrO_4$ of reduced solubility produced, according to the present invention, displays incrementally but nevertheless noticeably enhanced corrosion inhibition performance in organic coating applications.

It appears that the natural solubility of $SrCrO_4$, although moderate (see Table A), is excessive to some extent in comparison to an optimum solubility value. The above consideration is also supported by $I_r=5$ of $SrCrO_4$ (see Table A), indicating that its $c_{isat}$ is about 5 times higher than $c_{icrit} \sim 1$ mmol/L of $CrO_4^{--}$, that is the minimum concentration required for maximum possible corrosion inhibitor performance of the species. Considering all of the above, it appears reasonable to state that the solubility of $SrCrO_4^{--}$(or generally, of any pigment grade corrosion inhibitor containing $CrO_4^{--}$ species), should be: 1 mmol/L<$c_{isat}$<5 mmol/L.

In addition to noticeable enhancement of its corrosion inhibitive performance, additional beneficial effects of solubility reduction of pigment grade $SrCrO_4$ are: improved correlation between pigments' solubility and paint stability as well as reduction of leaching of related ionic species from organic coatings.

It is well known with regard to paint stability, that ionic species such as $CrO_4^{--}$ and $Sr^{++}$ dissolved in the aqueous phase of water-born paint formulations, adversely affect the Theological stability of latter. In general, direct proportionality can be expected between the solubility of pigments, or concentration of related species, and the extent of this de-stabilizing effect. Consequently, reduction of solubility of pigment grade $SrCrO_4$ should be beneficial in this respect.

Similarly, the leaching rates of $CrO_4^{2-}$ species from organic coatings are directly proportional with $c_{isat}$ of related pigments, in this particular case with the solubility of $SrCrO_4$. Leaching, while useful due to its being the only transport process for inhibitor species at discontinuity sites in organic coatings, is also detrimental, however, due to causation of increased porosity and, in general, in diminished protective capacity of pigmented primers.

Moreover, it has been observed, that reduced solubility, realized according to the process of the present invention, results also in significant reduction of the clumping tendency of pigment grade $SrCrO_4$.

A direct correlation was intuitively expected between the solubility (moderate hygroscopic character) and clumping tendency of $SrCrO_4$. Indeed, it has been observed, that reduced solubility, realized according to the present invention, results also in significant reduction of the clumping tendency of pigment grade $SrCrO_4$. This observation is documented in Example 7.

Considering all of the foregoing, it appears desirable to optimize the solubility of corrosion inhibitor pigments, in general. In the particular case of $SrCrO_4$, it appears that by reducing solubility, all functional characteristics of this pigment can be improved, inclusive of corrosion inhibitor performance and rheological behavior. As specified earlier however, $c_{isat}$ or solubility of $SrCrO_4$ must not be reduced to less than 1 mmol/L.

In accordance with the invention, a procedure has been found which is very effective in reducing the natural solubility of $SrCrO_4$. This procedure is based essentially on a chemisorption process, which occurs spontaneously on the surface of finely divided $SrCrO_4$, when the latter is dispersed in an aqueous solution of any one or more of a diverse group of soluble salts or derivatives of phosphoric acid.

An important aspect of the invention is the use of derivatives of $H_3PO_4$ as surface modifying agents for treating strontium chromate and altering the surface characteristics thereof. In accordance with a further aspect of the invention, the derivatives of phosphoric acid used to modify the strontium chromate surface characteristics include alkali metal salts, alkali metal acid salts, and ammonium salts phosphoric acids including orthophosphoric acid, metaphosphoric acid and phosphorus acid.

In accordance with an important aspect of the invention, preferred surface modification agents for treatment of strontium chromate include alkali, alkali acid salts, or ammonium salts of acids selected from the group consisting of $H_4P_2O_7$, $H_5P_3O_{10}$, $H_3PO_3$ and $H_3PO_4$.

In accordance with a further related aspect of the invention, such preferred treating agents include materials selected from the group consisting of: $Na_4P_2O_7$, $K_4P_2O_7$, $Na_5P_3O_{10}$, $K_5P_3O_{10}$, $Na_2HPO_3$, $K_2HPO_3$, $Na_3PO_4$, $K_3PO_4$, $NaH_2PO_4$, $KH_2PO_4$, $Na_2H_2P_2O_7$, $K_2H_2P_2O_7$, $(NaOPO_2)_3$, $(KOPO_2)_3$, $NaNH_4HPO_4 \cdot 4H_2O$ and $KNH_4HPO_4 \cdot 4H_2O$.

As illustrated below for $Na_4P_2O_7$ (tetra-sodium pyrophosphate), one of the preferred surface modifying agents, the chemisorption of diverse ionic phosphate species occurs, presumably, by an exchange mechanism, with the participation of the anionic species: $SrCrO_4/(2SrCrO_4)_n + nP_2O_7^{4-} \leftrightharpoons SrCrO_4/(Sr_2P_2O_7)_n + 2nCrO_4^{--}2$. where typically $n=10^{-4}-10^{-2}$.

It is reasonable to assume, that chemisorption of diverse ionic phosphate species results in formation of essentially insoluble compounds on the surface of treated $SrCrO_4$, and consequently, the equilibrium of Reaction 2 is shifted to the extreme right. The resultant surface species are believed to be chemically similar to the correspondent bulk salts of strontium, such as $Sr_2P_2O_7$ or strontium pyrophosphate, in the above case.

Taking into account the above considerations, it appears reasonable to assume that chemisorption of phosphate species radically alters the chemical composition of the surface of $SrCrO_4$ crystallites, and as a consequence, alteration of some of related physical surface properties can be intuitively expected.

An important aspect of the present invention is that chemisorption of diverse phosphate ionic species results in reduction of solubility of $SrCrO_4$ and as a consequence, in improvement of all functional characteristics of this pigment grade product, in particular, its corrosion inhibitor performance and mitigation of its tendency for clump formation. It has been observed that the chemisorption process (Reaction 2), occurs practically instantaneously.

A function also of the $SrCrO_4$ phase's specific surface area, a critical stoichiometrical ratio apparently exists between the treating species and $SrCrO_4$, above which the process is self-limiting, as might be expected on basis of generally accepted concepts of surface chemistry.

For example, in the exemplary case of $P_2O_7^{4-}$, at typical values of specific surface area of $SrCrO_4$ corresponding to a 2–5 micron average particle diameter, the critical value of the molar ratio was found to be in the range of $Na_4P_2O_7/SrCrO_4=9\times10^{-4}-1.8\times10^{-3}$ above which the chemisorption process is self-limiting.

The self-limiting character of the chemisorption process indicates, that at the critical value of the molar ratio, the adsorbent solid phase's particle surfaces become completely covered by a layer of chemisorbed species, and, essentially, Reaction 2 stops. Due to the practically insoluble character of the chemisorbed $Sr_2P_2O_7$ layer, it was observed that the chemisorption process becomes self-limiting even at the quite low initial bulk concentrations of about 0.5–1.5 mmole $P_2O_7^{4-}/L$.

As for distribution, it is reasonable to assume a uniform spread of the chemisorbed layer on the adsorbent's surface, although the process could preferentially occur at high energy sites such as edges or tips of crystallites. Assuming, however, an insoluble layer of $Sr_2P_2O_7$ uniformly distributed on the surfaces of pigment grade $SrCrO_4$, of particles with diameters of 5 micron, the thickness of insoluble layer (at the molar ratio value of $Sr_2P_2O_7/SrCrO_4=1\times10^{-3}$) is estimated at approximately 10–20 Angstrom. It will be apparent, however, that in the $0<Sr_2P_2O_7/SrCrO_4<1\times10^{-3}$ value range of molar ratios, the corresponding thickness of the chemisorbed layer will be 0–10 Angstrom and the adsorbant's surface coverage, only partial.

The chemisorbed layer may represent 0.005% to 1% of the modified chromate. Generally, the chemisorbed $Sr_2P_2O_7$ layer, at saturation, amounts to about 0.017–0.34% by weight of the resultant surface modified $SrCro_4$, and consequently some of the desirable physical characteristics of the latter, such as specific gravity, pH or color, are unaltered. As will also be apparent, the $CrO_4^{2-}$ content of surface modified $SrCrO_4$ produced according to the present invention, is substantially undiminished in comparison to the pigment grade versions heretofore known in the art.

Understandably and with no intent, however, to limit the concept, the preferred examples of realization of the present invention are versions of pigment grade $SrCrO_4$ surface modified to saturation, which can be formally symbolized by the general formula of $(Sr_{x/2}P_yO_z)n/SrCrO_4$, where n, the stoichiometric coefficient is approximately $n=1\times10^{-4}-2\times10^{-3}$. $Sr_{x/2}P_yO_z$ symbolizes chemisorbed layers consisting of Sr-salts of various oxy anions of phosphorus, organic derivatives and hetero-poly anions included, and x,y,z are correspondent stoichiometric indices. In the significant case of $P_2O_7^{4-}$ as a preferred chemisorbed species, the resultant product is symbolized by $(Sr_2P_2O_7)n/SrCrO_4$, where $n=1\times10^{-4}-2\times10^{-3}$.

Notably, the chemisorbed layers obtained in accordance with the present invention, possess remarkable mechanical stability, which assures the feasibility of the surface modification procedure in industrial conditions. For example, it was observed, pursuant to the present invention, that the $Sr_2P_2O_7$ layer of $(Sr_2P_2O_7)n/SrCrO_4$, $n=1\times10^{-4}-2\times10^{-3}$, withstands, without apparent breakdown, drying, and, more specifically, subsequent grinding, which are some of the typical steps used in pigment manufacture.

As expected on the basis of Reaction 2, chemisorbed layers on $SrCrO_4$, obtained according to the present invention, also display stability in aqueous media in neutral, moderately acidic or alkaline conditions, wherein they resist dissolution. It was learned, however, that the stability of freshly formed chemisorbed layers is limited. They degrade on extensive contact, for several hours at elevated temperature with aqueous phases. Notably, it was also realized pursuant to the present invention, that chemisorbed layers on $SrCrO_4$ must be effectively stabilized by drying of the previously filtered products, typically performed at 100–110° C. For example, $(Sr_2P_2O_7)n/SrCrO_4$, $n=1\times10^{-4}-2\times10^{-3}$ produced according to the present invention, is processed by filtration and subsequent drying at 100–110° C.

Stabilized $Sr_{x/2}P_yO_z$ layers of $(Sr_{x/2}P_yO_z)n/SrCrO_4$, $n=1\times10^{-4}-2\times10^{-3}$ type products resist solubilization in water but allow gradual discharge of the host $SrCrO_4$ by dissolution. In contact with water, with no apparent effect on the dissolution rate, they reduce $c_{isat}$, the solubility of host $SrCrO_4$, as previously mentioned. $\Delta c_{isat}$, the extent of reduction of the host's solubility appears to be directly proportional to the degree of coverage of the host's surface by the $Sr_{x/2}P_yO_z$ layers. It seems to be dependent on the chemical identity of latter and notably, is maximized at saturation. $\Delta c_{isat}$ can be conveniently defined by: $\%\Delta c_{iast}=100\ (c_{isat-md}-c_{isat})/c_{isat}$, where $c_{isat-md}$ is the solubility of surface modified $SrCrO_4$. Notably, $\%\Delta c_{isat}$ values are <0, by definition. It is interesting to note that $\Delta c_{isat}$ seems to be constant at saturation for each distinct $(Sr_{x/2}P_yO_z)n/SrCrO_4$, $n=1\times10^{-4}-2\times10^{-3}$ type product. More importantly, however, $\Delta c_{isat}$ of a product appears to remain constant as the solubilization of the host $SrCrO_4$ proceeds. Thus the discharge by dissolution of the host seems to resemble flow out of a "container." In the illustrative case of $(Sr_2P_2O_7)n/SrCrO_4$; $n=2.2\times10^{-3}$, where the surface coverage is assumed to be complete at a thickness of 10–20 Angstrom, the host's solubility is $c_{isat-md}=1.9$ mmol/L and $\Delta c_{isat}=-63$, as documented in 1.2 of Example 1.

Apparently, the desirable functional characteristics of surface modified pigment grade $(Sr_{x/2}P_yO_z)n/SrCrO_4$ type products are maximized at $n=1\times10^{-4}$ to $2\times10^{-3}$, that is at saturation of the host surface, which is preferred in the practice of the present invention. It can be concluded, that surface modified products of the present invention, behave like distinct chemical entities, having practically the chemical composition of technical grade $SrCrO_4$ (with $CrO_4^{2-}$, content undiminished) but with significantly reduced solubility in water.

The present invention provides an effective process for modifying the surface of finely divided pigment grade $SrCrO_4$. As a consequence of surface modification, pursuant to the invention, the natural solubility of the host product is significantly reduced while the functional characteristics, important for pigment grade $SrCrO_4$, are enhanced, inclusive of corrosion inhibitor performance and mitigation of clumping tendency.

Novel types of corrosion inhibitor pigment grade $SrCrO_4$ are also provided, which can be generically symbolized by $(Sr_{x/2}P_yO_z)SrCrO_4$, $n=1\times10^{-4}-2\times10^{-3}$. Here $Sr_{x/2}P_yO_z$ symbolizes chemisorbed layers, as previously described. These novel type products behave like distinct chemical entities with respect to solubility, and generally, in pigment applications.

In practice, the surface modification procedure is realized by initially preparing an aqueous slurry of the host product, preferably of finely divided $SrCrO_4$. This slurry can be freshly produced by precipitation of $SrCrO_4$ or, alternatively, previously dried and finely ground product can be re-slurried in water, by intense agitation. Subsequently, the surface of the dispersed solid phase is modified, essentially according to Reaction 2 by chemisorption of diverse $P_yO_z^{x-}$ oxy anionic species of phosphorus, which result from dissociation of corresponding soluble salts or derivatives of the same. Practically, surface modification of $SrCrO_4$ slurry is performed by introducing a soluble oxy salt of phosphorus into the aqueous phase and by stirring it, preferably for 15-30 minutes, at ambient or higher temperatures. With no intent to limit the concept of the present invention, the initial concentration of $P_yO_z^{x-}$, realized in the aqueous phase, is preferred to be in the 0.5-1.5 mmole/L range and the $P_yO_z^{x-}/SrCrO_4$ molar ratio to be $1\times10^{-4}-2\times10^{-3}$. The process is finalized by filtration and washing to soluble salt-free conditions and subsequent drying of the solid phase at 100-110° C. The formed chemisorbed layer is also stabilized by the these steps. Typically, dry pigment grade products are ground to 100% 325 mesh fineness.

The oxy derivatives of phosphorous, applicable according to the present invention, include neutral or acidic $Li^+$, $Na^+$, $K^+$, $NH_4^+$ salts, and in general, any of the salts of: ortho-, pyro-, tri- and ploy-phosphoric acids, meta-phosphoric, poly-metaphosphoric, cyclic trimetaphosphoric acid, and phosphorous acids as well as mixtures thereof. It will be apparent that the list of applicable derivatives also includes the corresponding acids, the relatively soluble acidic salts of $Ca^{2+}$, $Sr^{2+}$, $Ba^{2+}$, $Mg^{2+}$, as well as the alkyl- or aryl-ammonium salts of the same. Notably, various acidic organic esters, primarily of ortho-, pyro-, or tri-phosphoric acid, phosphonic acid, as well as diverse phosphate-functionalized polymers and soluble salts of all the above, are also useful.

Examples of phosphorus oxy compounds, preferred in the practice of the invention for surface modification include: $Na_3PO_4$, $Na_2HPO_4$ and more preferably $Na_4P_2O_7$, $Na_5P_3O_{10}$ as well as the corresponding acids.

Examples of other applicable compounds include: $Ca(H_2PO_4)_2 \cdot H_2O$, $CaH_2P_2O_7$, $(NaOPO_2)_3$, $Na_3H_{15}Al_2(PO_4)_8$ and $NaH_{14}Al_3(PO_4)_8 4H_2O$ (dubbed as SALP-s in the bakery industry), soluble Na-polymetaphosphate, salts of hetero-poly acids, i.e.: $H_3PW_{12}O_{40}$, $H_3PMo_{12}O_{40}$; chelating agents and salts: phosphorus derivatives of nitrilotriacetic acid, (HO (O) $CH_2)_2$—$NCH_2$—$CH_2$—$PO_3H_2$ and alternatives such as $N(CH_2PO_3H_2)$ or nitrilotris(methylene phosphonic acid) and 1-hydroxyethylidene-1,1-diphosphonic acid, dubbed as HEDPA.

Also useful are salts of alkyl acid phosphates, $(RO)_2P(O)OH$, $(RO)P(O)(OH)_2$, where R—is an alkyl-, aryl- or poly-ethoxylated derivative. Finally, with no intent to limit the concept, however, phosphorilated starch, $[(NaO)_2P(O)—O—CH_2—C_6(O)H_3(OH)_2—O—]n$, is presented as an example of a phosphate-functionalized polymer.

Notably, it was also observed pursuant to the present invention, that a similar effect is achievable on other chromates, as well. More specifically, it was experimentally proven that the same procedure, ie., the chemosorption of diverse derivatives of the phosphoric acids, is very effective also in reducing the natural solubility of calcium and Zn(II) chromates.

The following examples, wherein all parts are given by weight unless otherwise noted, demonstrate further details of preferred processes and products of the present invention.

COMPARATIVE EXAMPLE 1

Pigment grade $SrCrO_4$ was produced according to the double decomposition process known to the art, as follows:

$$Sr(NO_3)_2 + Na_2CrO_4 \rightarrow SrCrO_4 + NaNO_3 \qquad 3.$$

In practice, the process was realized by initially dissolving each 1.0 mole (211.6 g) of $Sr(NO_3)_2$ (commercial quality, assay ~99%) and 1.0 mole (162.0g.) of $Na_2CrO_4$ (commercial, assay ~99%) in distinct separate 500 ml volumes of $H_2O$, at ambient temperature.

Subsequently, the $Na_2CrO_4$ solution was gradually introduced, in about 30 minutes, into the intensively stirred $Sr(NO_3)_2$ solution and, if necessary, the pH of the system was adjusted to pH =8 to 8.5. The obtained pigment slurry was further conditioned by stirring for 1 hour at 50° to 60° C., after which the pH of the system was adjusted again, if necessary, to the same values as before.

After separation by filtration and washing to soluble salt contaminant-free condition, the pigment press-cakes were dried overnight at about 110° C. and subsequently pulverized to 100% +325 mesh fineness. The yield, before grinding, was 192.0 g., 94%.

Following common analytical procedures, the pigment grade products were characterized by the quality parameter values subsequently disclosed:

| COMPARATIVE TABLE 1 | |
|---|---|
| Quality Parameters: | Determined Values: |
| appearance | yellow powder |
| specific gravity, according to ASTM | 3.85 |
| chromate content (as $CrO_3$ %) | 48.65 |
| $e_{isp}$, specific inhibitor capacity* | 18.7 |
| $c_{isat}$, solubility at ambient temperature, mmol/L | 5.17 |
| $I_i$, inhibitive activity* | ~5 |
| pH of saturated leachet, according to ASTM | 8.4 |
| calculated SrCrO4 content, % | 99.0 |

*calculated according to formulae presented above.

Notably, the obtained values of characteristic parameters such as $e_{isp}$, $c_{isat}$ and $I_i$ or related specific gravity, $CrO_3$% and solubility, correspond reasonably well with theoretical ones (i.e.: theoretical $CrO_3$% =49.11), as well as with values relevant to commercial products, published in the literature. (See also Comparative Table 3) Consequently, the product was considered chemically pure, corresponding to the general formula $SrCrO_4$.

COMPARATIVE EXAMPLE 2

Solubility in water, $c_{isat}$, at ambient temperature of all pigment grade $SrCrO_4$ produced pursuant to the present invention (according to Comparative Example 1 and Examples 1 to 3), as well as of selected commercially available $SrCrO_4$ identified as Sample (a) and Sample (b) pigments (see also Comparative Example 3) employed as controls pursuant to the present invention, was determined according to an experimental protocol, as follows: 20g of $SrCrO_4$ pigment were introduced into 200 ml deionized water and stirred for 2 hours at ambient temperature, after which the slurry's temperature was adjusted to 22° ±1° C., by keeping it in thermostated and under static conditions for 2 hours. After decantation, the clear supernatant was filtered and the $CrO_4^{--}$ content of the saturated solution was determined in a 100 ml aliquot by the well known indirect iodometric titration method.

The process, as described, was repeated two consecutive times on the same wet pigment sample, the obtained $CrO_4^{--}$ content values averaged, and $c_{isat}$, the product's solubility at 22±1° C., was expressed as mmoles of $SrCrO_4$ dissolved in 1000ml saturated solution.

COMPARATIVE EXAMPLE 3

This example is presented to introduce two commercially available pigment grade strontium chromate samples, labeled as commercial $SrCrO_4$ Sample (a) and commercial $SrCrO_4$ Sample (b), and to compare the same with pure $SrCrO_4$ produced according to Comparative Example 1. It will be noted, that these 3 varieties of $SrCrO_4$ were applied as controls in all subsequently presented examples of realization of the present invention.

COMPARATIVE TABLE 3

| Quality Parameters: | Determined values/product: | | |
|---|---|---|---|
| | $SrCrO_4$(a) | $SrCrO_4$(b) | Comp. Ex. 1 |
| appearance | yellow powder | | |
| specific gravity according to ASTM | 3.79 | 3.82 | 3.85 |
| chromate content (as $CrO_3$ %) | 48.02 | 47.85 | 48.65 |
| $e_{isp}$, specific inhibitor capacity* | 18.2 | 18.28 | 18.7 |
| $c_{isat}$, solubility at ambient temperature | 4.8 | 5.0 | 5.17 |
| $I_i$, inhibitive activity* | ~5 | ~5 | ~5 |
| pH of saturated leachet, according to aSTM | 8.3 | 8.1 | 8.4 |
| calculated $SrCrO_4$ content, % | 97.77 | 97.43 | 99.06 |

*calculated, according to expressions above introduced

As can be seen, commercially available strontium chromate pigments, although of technical grade, can be considered reasonably pure products.

EXAMPLE 1

Pigment grade $SrCrO_4$ of a novel kind, characterized by reduced solubility, which can be symbolized herein by the chemical formula: $Sr_2P_2O_7/SrCrO_4/$, was produced according to the procedure:

$$Sr(NO_3)_2 + Na_2CrO_4 \rightarrow SrCrO_4 + 2NaNO_3 + nNa_4P_2O_7 \rightarrow n(Sr_2P_2O_7)/SrCrO_4 + 2nCrO_4^{--} + 4n\ Na^+ + 2NaNO_3 \quad 4.$$

in two distinct qualities, as follow: 1.1 where $n=9.5\times10^{-4}$ and 1.2 where $n=2.2\times10^{-3}$.

The process was performed in similar fashion as described in Comparative Example 1, by initially dissolving 1.0 mole (211.6 g) of $Sr(NO_3)_2$ (commercial quality, assay ~99%) and 1.0 mole (162.0g) of $Na_2CrO_4$ (commercially available assay ~99%) in separate 500 ml volumes of $H_2O$, at ambient temperature.

Subsequently, the $Na_2CrO_4$ solution was gradually introduced in about 30 minutes, into the intensively stirred $Sr(NO_3)_2$ solution and, if necessary, the pH of the system was adjusted to pH =8 to 8.5.

The resultant pigment slurry was further conditioned by stirring for 1 hour at 50° to 60° C., after which the pH of the system was adjusted again, if necessary, to the same values as before.

Pursuant to the present invention, pigment grade strontium chromate, conforming the above specified chemical formulas, was produced by introducing, in about 30 minutes, $9.5\times10^{-4}$ moles (0.25g) of $Na_4P_2O_7$ in the case of Example 1.1, or alternatively, $2.2\times10^{-3}$ moles (0.58g) of the same, in the case of Example 1.2, (as aqueous solution of about 1%) into the intensively stirred slurry and keeping the same conditions for an additional hour.

After separation by filtration and washing to soluble salt contaminant-free condition, the pigment press-cakes were dried overnight at about 110° C. and, subsequently, pulverized to 100% +325 mesh fineness. Yields, before grinding, were: 193g (95%) and 195g (96%) for 1.1 and 1.2., respectively.

Following common analytical procedures, the pigment grade products were characterized by the quality parameter values shown in Table 1:

TABLE 1

| | Determined values | |
|---|---|---|
| Quality parameters: | 1.1 | 1.2 |
| appearance | yellow powder | |
| specific gravity, according to ASTM | 3.82 | 3.92 |
| chromate content (as $CrO_3$ %) | 48.41 | 48.25 |
| $e_{isp}$, specific inhibitor capacity* | 18.5 | 18.9 |
| $c_{isat}$ mmole/L | 2.4 | 1.9 |
| % Δ $c_{isat}$* | −53 | −63 |
| $I_i$, inhibitive activity* | ~2.5 | ~2.0 |
| pH of saturated leachet according to ASTM | 7.8 | 7.9 |
| calculated $SrCrO_4$ content, % | 98.6 | 98.2 |

*calculated as above specified

Notably, the measured values of some characteristic parameter, such as specific gravity, $CrO_3$% and $e_{isp}$, correspond reasonably well with values characteristic to pure $SrCrO_4$ (see also Comparative Table 1)

It is important to observe, however, that $c_{isat}$, the solubility and related $I_i$ of $n(Sr_2P_2O_7)/SrCrO_4$ produced according to the present invention, which are thermodynamic constants of chemical entities, have significantly reduced numeric values in comparison to numeric values characteristic to $SrCrO_4$ known to the art. It will be noted, that distinctly different, substantially reduced numeric values of these thermodynamic constants, i.e. $c_{isat}$ and $I_i$, indicate that $n(Sr_2PO_7)/SrCrO_4$ produced according to the present invention, constitutes a novel type of $SrCrO_4$, distinctly different from pure or pigment grade $SrCrO_4$, heretofore known to the art.

EXAMPLE 2

Pigment grade strontium chromate, represented by the chemical formula of $n(Sr_2HP_3O_{10})/SrCrO_4$, where $n=1.0\times10^{-3}$ was produced in identical fashion as described in Example 1, except that, in this case, $1.0\times10^{-3}$ moles (0.37g) of $Na_5P_3O_{10}$, ie., sodium tripolyphosphate, was employed in lieu of $Na_4P_2O_7$. Yield: 194.0g. ~95%;

TABLE 2

| Quality parameters: | Determined values: |
|---|---|
| appearance | yellow powder |
| specific gravity, according to ASTM | 3.87 |
| chromate content (as $CrO_3$ %) | 42.2 |
| $e_{isp}$, specific inhibitor capacity (calculated) | 18.6 |
| $c_{isat}$ solubility at ambient temperature, mmol/L | 2.1 |
| % Δ $c_{isat}$ (calculated) | −59 |
| $I_i$, inhibitive activity (calculated) | ~2 |
| pH of saturated leachet, according to ASTM | 8.0 |
| calculated $SrCrO_4$ content, %. | 98.1 |

Note that the measured values of some characteristic parameters, such as specific gravity, $CrO_3$% and $e_{isp}$, correspond reasonably well with values characteristic to pure $SrCrO_4$ (see also Comparative Table 1).

It will be observed again, however, (see also Example 1), that $c_{isat}$, the solubility and related $I_i$, which are thermodynamic constants of chemical entities, have significantly reduced numeric values in comparison to numeric values characteristic to unmodified $SrCrO_4$, heretofore known to the art.

EXAMPLE 3

Modified pigment grade strontium chromate, represented by the chemical formula of $n(SrHPO_4)/SrCrO_4$ where $n=2.5\times10^{-3}$, was produced in identical fashion as described in Example 1, except that, in this case, $2.5\times10^{-3}$ moles (0.36g) of $Na_2HPO_4$ were employed in lieu of $Na_4P_2O_7$. Yield: 197.0g, 97%.

TABLE 3

| Quality parameters: | Determined values: |
|---|---|
| appearance | yellow powder |
| specific gravity, according to ASTM | 3.85 |
| chromate content (as $CrO_3$ %) | 48.3 |
| $e_{isp}$, specific inhibitor capacity (calculated) | 18.6 |
| $c_{isat}$, solubility at ambient temperature, mmol/l | 3.7 |
| % Δ $c_{isat}$ (calculated) | −28 |
| $I_i$, inhibitive activity (calculated) | <4 |
| pH of saturated leachet, according to ASTM | 8.1 |
| calculated $SrCrO_4$ content, % | 98.3 |

It will be noted again, the measured values of some characteristic parameters, such as specific gravity, $CrO_3$% and $e_{isp}$, correspond reasonably well with values characteristic to pure $SrCrO_4$ (see also Comparative Table 1). %Δ$c_{isat}$=−28 is also noted.

EXAMPLE 4

This example is intended to demonstrate that stabilized $Sr_{x/2}P_yO_z$ layers of $(Sr_{x/2}P_yO_z)n/SrCrO_4$, $n\times1\times10^{-4}$–$2\times10^{-3}$ -type products resist solubilization in water and perform rather like "containers" which allow discharge of the host $SrCrO_4$ by dissolution.

It is also intended to document that $\Delta c_{isat}$ of a distinct product remains practically constant as the solubilization of the host $SrCrO_4$ proceeds, that is during the discharge by dissolution of the above suggested "container".

For that purpose, the solubility of $SrCrO_4$ (as the control) produced according to Comparative Example 1 and of $(Sr_2P_2O_7)n/SrCrO_4$, $n=2.2\times10^{-3}$ according to 1.2. of Example 1, was determined several consecutive times, on the same respective samples, following the procedure disclosed in Comparative Example 2. The experimental results are presented below.

TABLE 4

| | extracted product/solubility, mmol/L | |
|---|---|---|
| Number of extractions | $SrCrO4$, Comp. Ex. 1 $c_{isat}$ | $n(Sr_2P_2O_7)/SrCrO_4$, Ex. 1.2 $c_{isat}$ |
| 1. | 5.17 | 3.24 |
| 2. | 4.64 | 1.97 |
| 3. | 4.8 | 1.75 |
| 4. | 4.46 | 1.75 |
| 5. | 4.52 | — |

As can be seen, for $n(Sr_2P_2O_7)/SrCrO_4$, $n=2.2\times10^{-3}$, the $c_{isat}$ (as presented in Table 4) as well as the related values of $\Delta c_{isat}$=−37; −57; −63; −60;, respectively, were quite constant.

It can be concluded, that the surface modified $(Sr_2P_2O_7)n/SrCrO_4$, $n=2.2\times10^{-3}$ obtained according to the present invention, behaves like distinct chemical entity in the solubilization process.

EXAMPLE 5

Two package epoxy primer formulation was prepared as subsequently described in Table 5, with the intent to test the corrosion inhibitor performance of pigment grade $n(SrP_2O_7)/SrCrO_4$ of reduced solubility, where $n=9.5\times10^{-4}$, produced according to 1.1 of Example 1, in comparison with two commercial grade $SrCrO_4$ pigments coded as Commercial $SrCrO_4$ (a) and Commercial $SrCrO_4$ (b), respectively. (See Comparative Example 3)

For that purpose, 3 versions of the formulation were produced:

1) Control Primer(a), containing commercial $SrCrO_4$(a),
2) Control Primer(b), containing commercial $SrCrO_4$(b)
3) Test Primer, containing pigment grade $n(SrP_2O_7/SrCrO_4/$, $n=9.5\times10^{-4}$, according to 1.1 of Example 1.

TABLE 5

| Raw materials | Trade names, suppliers | Parts by weight |
|---|---|---|
| Part I. | | |
| Epoxy resin | Epon 1001-X075 (1) | 182.0 |
| Corrosion Inhibitor Pigment* | SrCrO4 according to Primer a.), Primer b.) and Test primer | 120.0 |
| White pigment, TiO2 | RLC-535 (2) | 23.0 |
| Filler pigment | | |
| Talc | 40-27 Talc (3) | 55.0 |
| Silica, natural | Min-U-Sil 15 (4) | 29.0 |
| Solvent | | |
| Glycol Ether PM | | 164.0 |
| Methyl Isobutyl Ketone | | 41.0 |
| Part II. | | |
| Hardener | HY-815 Polymide (5) | 75.0 |

TABLE 5-continued

| Raw materials | Trade names, suppliers | Parts by weight |
|---|---|---|
| Solvent | | |
| Iso-propanol | | 245.0 |
| Toluene | | 66.0 |
| Total | | 1000.0 |

Raw material suppliers:
(1) Shell Chemical ompany;
(2) Millennium Inorganic Chemical;
(3) Harcross Pigments;
(4) U.S. Silica Company;
(5) Ciba-Geigy Corporation;
*$SrCrO_4$
a.) and $SrCrO_4$
b.) are commercially available pigment grade products.

EXAMPLE 6

The corrosion inhibitor performance of pigment grade $n(SrP_2O_7)/SrCrO_4$, $n=9.5 \times 10^{-4}$, according to 1.1. of Example 1, was assessed in comparison with commercial $SrCrO_4$ (a) and commercial $SrCrO_4$ (b), by applying each Control Primer and the Test Primer (by wire wound rod technique) on several distinct polished cold rolled steel panels (from the Q-Panel Corporation), at 0.4–0.5 mils dry film thickness and dried overnight at 140° F. After scribing and taping of the edges, several of the Test and of each Control panels were subject to salt spray exposure pursuant to ASTM B-117 and the corrosion inhibitor performance of both Control and the Test Primer applications was comparatively assessed (at increasing exposure time intervals), graded on the "0 (worst) to 10 (best)" scale for blister size and on the "dense, D; medium-dense, M-D; medium, M; Few, F;" descriptive scale for blister frequency, according to ASTM D-714 and the values averaged. Notably, the observed protective performance (against corrosion) of both of the Control and Test Primer applications was attributed to, and considered directly proportional with the correspondent inhibitor pigment's corrosion inhibitor performance, that is of Commercial $SrCrO_4$ (a), Commercial $SrCrO_4$ (b) and $n(Sr_2P_2O_7)/SrCrO_4$, $n=9.5 \times 10^{-4}$, respectively. Test results are presented below.

TABLE 6

Exposure time to Primer formulation and related performance grades:
salt fog, in hours: Blister size (numeric), blister frequency (descriptive)

| | Control (a) | | Control (b) | | Test Primer | |
|---|---|---|---|---|---|---|
| | At Scribe | In field | At scribe | In field | At scribe | In field |
| 240 | F,8 | 10 | F,8 | 10 | F,8 | 10 |
| 408 | M,6 | 10 | F,6 | 10 | F,8 | 10 |
| 600 | M,5 | 10 | F-M,5 | 10 | F,7 | 10 |
| 768 | M-D,4 | 10 | M,5 | F,8 | M,7 | 10 |
| 93 | D,4 | 10 | M-D,5 | F,7 | M,6 | 10 |
| 1176 | D,3 | F,8 | D,4 | F,6 | M-D,5 | F,8 |

Based on the above experimental data, it was concluded that pigment grade $n(Sr_2PO_7)/SrCrO_4$, where $n=9.5 \times 10^{-4}$, of reduced solubility, according to 1.1 of Example 1, under quite discriminate test conditions (salt spray exposure time: in excess of 1000 days), displayed incrementally, however noticeably better corrosion inhibition performance in comparison to Commercial $SrCrO_4$ (a) and Commercial $SrCrO_4$ (b), in an epoxy primer application on polished cold rolled steel. Taking into account, however, what is known regarding the corrosion inhibitor action mechanism and performance of $SrCrO_4$, the above conclusion appears to be reasonably valid for the other metal substrates or paint systems, as well. It also appears reasonable to conclude, that reduced solubility does not diminish the corrosion inhibition performance of pigment grade $SrCrO_4$, as long as the correspondent values of $I_i > 1$.

As noted from Table 1, the solubility of $n(Sr_2P_2O_7)/SrCrO_4$, (where $n=9.5 \times 10^{-4}$), according to 1.1 of Example 1) is $c_{isat} \sim 2/4$ mmol/L and the corresponding $I_i \sim 2.5$.

EXAMPLE 7

Tendency for clump formation during storage of pigment grade $n(Sr_2P_2O_7)/SrCrO_4$, where $n=9.5 \times 10^{-4}$ per 1.1 of Example 1, $n=2.2 \times 10^{-3}$ per 1.2 of Example 1, and of $SrCrO_4$ according to Comparative Example 1, as well as of commercial $SrCrO_4$ (a) and Commercial $SrCrO_4$ (b), was determined according to the following experimental protocol:

Statistically significant numbers of pellets of each pigment were produced by compressing 2.5 to 3.0g ($w_i$) of finely ground pigment grade product in a cylindrical mold of 13 mm diameter, at approximately 6.8 kg/cm² pressure for 1 minute.

The initial value of compressive strength ($F_1$) was measured on a significant number of pellets representing each distinct pigment grade product, by applying gradually increased pressure on them and observing the critical value at which the disintegration of the pellets started. Conveniently, $F_1$ was expressed in kg/cm2 units and the results averaged per pigment grade product. Concurrently, a distinct sampling, consisting of significant number of identical pellets representing each distinct pigment grade product, was exposed to 100% relative humidity conditions in a closed system at ambient temperature for 24 hours, after which the weight increase (w) due to water absorption, was determined and averaged. Subsequently, the pellets were kept at ambient temperature and approximately 60% Relative Humidity for 3 to 4 hours, until water desorption was completed ($w_i$ reached), and consecutively, the resultant value of compressive strength (F) was measured and the data averaged.

The hygroscopic character and more importantly, the tendency for clump formation during storage of pigment grade strontium chromate was qualified by % absorbed $H_2O = 100 \ (w-w_i)/w_i$ and respectively by $I_{cl}$, the index of tendency for clump formation, arbitrarily defined as $I_{cl} = (F - F_i)/F_i$ It will be apparent that relatively high value of $I_{cl}$ indicates strong tendency for clump formation of pigment grade products during storage, and specifically, under humidity conditions.

TABLE 7

| Identity of $SrCrO_4$ Pigment | $H_2O$ absorbed % | $F_i$ Kg/cm₂ | F Kg/cm₂ | $I_{cl}$ % |
|---|---|---|---|---|
| Commercial $SrCrO_4$ (a) | ~1.3 | 0.5 | 1.5 | 200 |
| Commercial $SrCrO_4$ (b) | ~1 | 0.5 | 1.2 | 140 |
| According to Comparative Example 1 | ~1.5 | 0.7 | 2.6 | 270 |

TABLE 7-continued

| Identity of SrCrO$_4$ Pigment | H$_2$O absorbed % | F$_i$ Kg/cm$_2$ | F Kg/cm$_2$ | I$_{cl}$ % |
|---|---|---|---|---|
| According to 1.1 of Example 1 | 1 | 0.5 | 0.7 | 40 |
| According to 1.2 of Example 1 | 1 | 0.5 | 0.6 | 20 |

As seen, $I_{cl}$, the clumping tendency of pure SrCrO$_4$ (of Comparative Example 1) and of commercial pigment grades SrCrO$_4$ (a) and (b) varies from 140% to 270%, presumably as a function of the manufacturing process used. In comparison to SrCrO$_4$ produced according to Comparative Example 1, pigment grade surface modified products symbolized by (Sr$_2$P$_2$O$_7$)n/SrCrO$_4$, n=9.5×10$^{-4}$ and n=2.2×10$^{-3}$, (per 1.1 and 1.2 of Example 1) display 6 times, and 13 times, respectively, lesser tendency for clumping. Apparently, there is a reverse proportionality between clumping tendency and the extent of surface coverage of surface modified SrCrO$_4$ produced according to the present invention.

EXAMPLE 8

This example is intended to display, in condensed fashion, numeric values of, and relevant specifically to SrCrO$_4$ according to the present invention, differences in numeric values of some functional parameters or thermodynamic constants, which (by distinct numeric values) define chemical entities. It will be noted that the comparatively reduced values of the thermodynamic constants $c_{isat}$ and $I_i$, indicate that treated SrCrO$_4$ produced according to the present invention, constitutes a novel substance, distinctly different from pure or pigment grade SrCrO$_4$ known in the art.

TABLE 8

| Identity of SrCrO$_4$ | % SrCrO4 | g$_{sp}$ | e$_{isp}$ | % Δc$_{isat}$ | I$_i$ | I$_{cl}$ | Inhibitor Performance pigment |
|---|---|---|---|---|---|---|---|
| Commercial SrCrO$_4$ (a) | 97.77 | 3.79 | 18.2 | ~0 | ~5 | 200 | Good |
| Commercial SrCrO$_4$ (b) | 97.43 | 3.82 | 18.28 | ~0 | ~5 | 140 | Good |
| According to Comparative Example 1 | 99.06 | 3.85 | 18.7 | ~0 | ~5 | 270 | — |
| According to Example 1.1 | 98.6 | 3.82 | 18.5 | −53 | ~2.5 | 40 | Comparatively enhanced |
| According to Example 1.2 | 98.2 | 3.92 | 18.9 | −63 | ~2 | 20 | — |

It can be concluded, that the surface modified products of (Sr$_2$P$_2$O$_7$)n/SrCrO$_4$ (where n=9.5×10$^{-4}$ and n=2.2×10$_{-3}$) type, obtained according to the present invention, behave like distinct chemical entities: they are characterized by the same assay as technical grade SrCrO$_4$ (% SrCrO$_4$ >98 and undiminished CrO$_4^{2-}$ content) and however, by significantly reduced solubility in water (%Δc$_{isat}$=−53, and −63, respectively).

What is claimed is:

1. A process for producing a strontium chromate corrosion inhibitor comprising:

providing an aqueous slurry containing dispersed particulate strontium chromate;

adding to said slurry a derivative of a phosphoric acid selected from the group consisting of ortho-phosphoric, pyro-phosphoric, tri-phosphoric polyphosphoric, metaphosphoric, polymetaphosphoric, cyclic tri-metaphosphoric acid, and phosphorous acid; and filtering and drying the resultant material, whereby particulate strontium chromate of reduced solubility is produced.

2. A process according to claim 1 wherein said soluble salt is selected from the group consisting of an alkali metal salt, an alkali metal acid salt; Ca$^{2+}$, Sr$^{2+}$, Ba$^{2+}$, and Mg$^{2+}$ acid salts; and an ammonium salt, an alkyl-ammonium salt, and an aryl-ammonium salt.

3. A process for producing a strontium chromate corrosion inhibitor comprising:

providing an aqueous slurry containing dispersed particulate strontium chromate;

adding to said slurry an oxy phosphorus compound selected from the group consisting of acidic organic esters of ortho-phosphoric acid, pyro-phosphoric acid, tri-phosphoric acid, phosphonic acid; Li$^+$, Na$^+$, K$^+$, NH$_4^+$, Ca$^{2+}$, Sr$^{2+}$, Ba$^{2+}$, and Mg$^{2+}$ acid salts of ortho-phosphoric acid, pyro-phosphoric acid and tri-phosphoric acid; phosphonic acid; and Li$^+$, Na$^+$, K$^+$, NH$_4^+$, Ca$^{2+}$, Sr$^{2+}$, Ba$^{2+}$, and Mg$^{2+}$ acid salts of ortho-phosphoric acid, pyro-phosphoric acid, tri-phosphoric acid, and phosphonic acid; and filtering and drying the resultant material whereby particulate strontium chromate of reduced solubility is produced.

4. A process for producing a strontium chromate corrosion inhibitor comprising:

providing an aqueous slurry containing dispersed particulate strontium chromate;

adding to said slurry an oxy phosphorus compound selected from the group consisting of:

Na$_3$PO$_4$, Na$_2$HPO$_4$, Na$_4$P$_2$O$_7$, Na$_5$P$_3$O$_{10}$, Na$_2$HPO$_3$, K$_2$HPO$_3$, K$_3$PO$_4$, Na$_2$H$_2$P$_2$O$_7$, K$_2$H$_2$P$_2$O$_7$, K$_2$HPO$_4$, K$_4$P$_2$O$_7$, K$_5$P$_3$O$_{10}$, Li$_3$PO$_4$, Li$_2$HPO$_4$, Li$_4$P$_2$O$_7$, Li$_5$P$_3$O$_{10}$, (NH$_4$)$_3$PO$_4$, (NH$_4$)$_2$HPO$_4$, (NH$_4$)$_4$P$_2$O$_7$, (NH$_4$)$_5$P$_3$O$_{10}$, NaNH$_4$.HPO$_4$.4H$_2$O, KNH$_4$HPO$_4$.4H$_2$O, H$_3$PO$_4$, H$_3$PO$_3$, H$_4$P$_2$O$_7$, H$_5$P$_3$O$_{10}$, Ca(H$_2$PO$_4$)2.H$_2$O, CaH$_2$P$_2$O$_7$, (NaOPO$_2$)$_3$, Na$_3$H$_{15}$Al$_2$(PO$_4$)$_8$, NaH$_{14}$Al$_2$(PO$_4$)$_8$.4H$_2$O, soluble Na-polymetaphosphate, soluble salts of H$_3$PW$_{12}$O$_{40}$, soluble salts of H$_3$PMo$_{12}$O$_{40}$, phosphorus derivatives of nitrilotriacetic acid, (HO(O)CH$_2$)$_2$—NCH$_2$—CH$_2$—PO$_3$H$_2$, N(CH$_2$PO$_3$H$_2$), nitrilotris(methylene phosphonic acid), 1-hydroxyethylidene-1,1-diphosphonic acid, soluble salts of alkyl acid phosphates, (RO)$_2$P(O)OH, (RO)P(O)(OH)$_2$, where R- is an alkyl-, aryl- or polyethoxylated derivative, and [(NaO)$_2$P(O)—O—CH$_2$—C$_6$(O)H$_3$(OH)2—O—]$_n$.

5. A strontium chromate product produced by the process of claim 4.

6. A strontium chromate product according to claim 5 having a solubility in water of about 0.5 to 4.5 mmole/L at ambient temperature.

7. A product according to claim 6 having a solubility of 2 to 4 mmole/L at ambient temperature.

8. A pigment grade corrosion inhibitor comprising SrCrO$_4$ in finely divided particulate form, individual particles thereof being coated with an oxy phosphorous stabilized surface layer derived from an oxy phosphorus compound selected from the group consisting of ortho-phosphoric acid, pyro-phosphoric acid, tri-phosphoric acid, phosphonic acid, acidic organic esters of said acids; $Li^+$, $Na^+$, $K^+$, $NH_4^+$, $Ca^{2+}$, $Sr^{2+}$, $Ba^{2+}$, and $Mg^{2+}$ acid salts of ortho-phosphoric acid, pyro-phosphoric acid or tri-phosphoric acid; phosphonic acid; and $Li^+$, $Na^+$, $K^+$, $NH_4^+$, $Ca^{2+}$, $Sr^{2+}$, $Ba^{2+}$, and $Mg^{2+}$ acid salts of ortho-phosphoric acid, pyro-phosphoric acid, tri-phosphoric acid, and phosphonic acid.

9. A corrosion inhibitor according to claim 8 wherein said $SrCrO_4$ particles are in the 2 to 5 micron range.

10. An inhibitor according to claim 8 wherein said stabilized surface layer of said corrosion inhibitor has a thickness of 0.5 to 200 Angstroms.

11. An inhibitor according to claim 10 wherein said stabilized surface layer of said corrosion inhibitor has a thickness of 0.5 to 20 Angstroms.

12. An inhibitor according to claim 8 wherein said oxy phosphorus compound comprises 0.005 to 1% by weight of said $SrCrO_4$.

13. A process for producing a strontium chromate, a zinc (II) chromate, or a calcium chromate corrosion inhibitor comprising:
  providing an aqueous slurry containing dispersed particles selected from particulate strontium chromate, zinc (II) chromate, and calcium chromate;
  adding to said slurry a phosphoric acid or a neutral or acidic soluble salt of a phosphoric acid selected from the group consisting of ortho-phosphoric, pyro-phosphoric, tri-phosphoric, polyphosphoric, metaphosphoric, polymetaphosphoric, cyclic tri-metaphosphoric acid, and phosphorous acid; and
  filtering and drying the resultant material whereby particulate chromate of reduced solubility is produced.

14. A pigment grade corrosion inhibitor comprising $SrCrO_4$, $ZnCrO_4$ or $CaCrO_4$ in finely divided particulate form, individual particles thereof being coated with an oxy phosphorous layer derived from an oxy phosphorus compound selected from the group consisting of ortho-phosphoric acid, pyro-phosphoric acid, tri-phosphoric acid, phosphonic acid, acidic organic esters of said acids; $Li^+$, $Na^+$, $K^+$, $NH_4^+$, $Ca^{2+}$, $Sr^{2+}$, $Ba^{2+}$, and $Mg^{2+}$ acid salts of ortho-phosphoric acid, pyro-phosphoric acid and tri-phosphoric acid; phosphonic acid; and $Li^+$, $Na^+$, $K^+$, $NH_4^+$, $Ca^{2+}$, $Sr^{2+}$, $Ba^{2+}$, and $Mg^{2+}$ acid salts of ortho-phosphoric acid, pyro-phosphoric acid, tri-phosphoric acid, and phosphonic acid.

* * * * *